Oct. 4, 1927.
F. C. DOBLE
1,644,422
APPARATUS FOR TESTING INSULATORS
Filed April 8, 1925
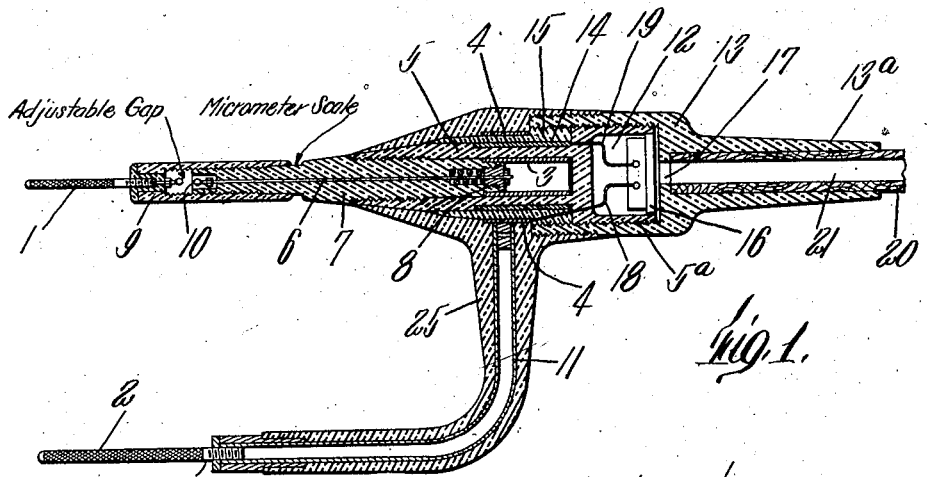
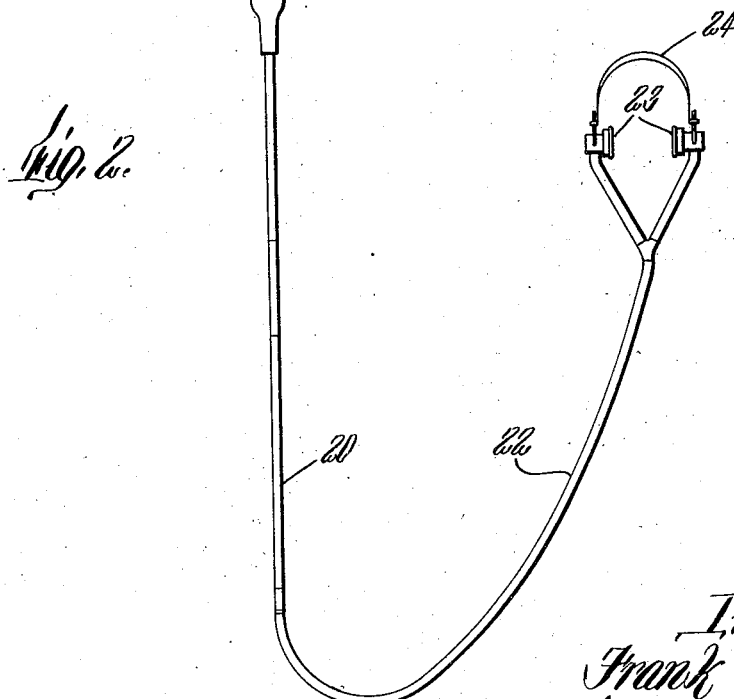
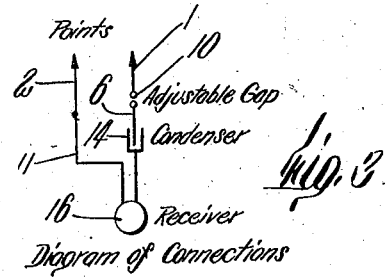
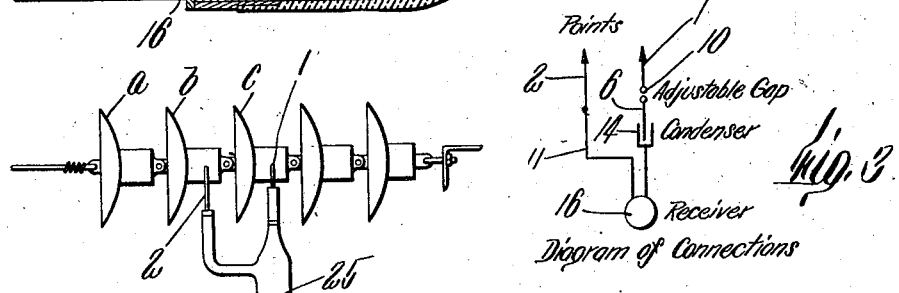
Inventor
Frank C. Doble
by Wright, Brown, Quinby & May
Attys Patented Oct. 4, 1927.

1,644,422

UNITED STATES PATENT OFFICE.

FRANK C. DOBLE, OF CAMBRIDGE, MASSACHUSETTS.

APPARATUS FOR TESTING INSULATORS.

Application filed April 8, 1925. Serial No. 21,494.

The present invention relates to apparatus for testing insulators, and particularly insulators of the suspension or strain type, and its object is to provide a testing apparatus of this character with means for safeguarding the operator by making impossible the occurrence of a short circuit through any part of the instrument between a high tension electrical transmission line and conductors at different electrical potential; to provide in connection with such an instrument a means for audibly indicating the presence or absence of voltage stress; and further to provide a means for indicating and measuring with a high degree of exactness, the intensity of such stress.

The instrument in which I have embodied this invention involves the principle of a condenser, supported by an insulating holder and provided with separated terminals extending from the opposite sides of the condenser (electrically speaking) and adapted to be brought into contact with the hardware connections at opposite sides of an individual insulating unit of the type used for suspension insulators. This type of testing device is disclosed and protected generically in the patent of the United States to Charles L. Kasson and Thomas H. Haines, No. 1,407,069, granted February 21, 1922. My present invention is a further development of the generic invention which involves the addition to an instrument involving such condenser and terminals, of electrically operated means for audibly indicating the presence of voltage stress between the terminals, means for indicating and measuring the intensity of the voltage stress, and external insulating means, additional to the dielectric of the condenser, disposed and effective to prevent a short circuiting flow of current through any part of the instrument between external points at respectively different electrical potentials with which the instrument can come into contact.

In the accompanying drawing illustrating the preferred embodiment of my present invention;

Figure 1 is a longitudinal section of the terminal portion of the testing apparatus;

Figure 2 is a side view of the testing apparatus as a whole in its relation to the insulators to be tested;

Figure 3 is a diagram of the elements and connections by which sound is produced when the terminals are brought into contact with parts between which voltage stress exists.

Like reference characters designate the same parts wherever they may occur in all the figures.

Referring first to Fig. 1 the terminal elements are designated 1 and 2. These are in electrical circuit respectively with the two plates or conducting elements of a condenser, constituted by an inner sleeve or tube 3 of conducting material, an outer sleeve or tube 14 of conducting material and an intermediate tubular body 5 of dielectric material. So far as the functions of the condenser are concerned, it is not material whether the members 3, 14 and 5 are tubular and cylindrical, or of any other shape; but for convenience of construction and assemblage the cylindrical tubular shape is preferred. The dielectric 5 may be of vulcanized hard rubber, or of any other material having sufficient dielectric and mechanical strength, and sufficient rigidity for the purposes which it has to serve. Between the terminal 1 and the inner member or plate 3 of the condenser is a conductor 6 embedded in a rod 7 of non-conducting material in electrical connection at the point 8 with the sleeve 3. Said rod 7 and the dielectric member 5 are complementally screw-threaded and screwed together. The terminal 1 is mounted on a sleeve 9, of insulating material which is threaded on the end of rod 7, by a fine and accurate screw thread. Between the inner end of terminal 1 and the outer end of conductor 6 is a gap 10 which may be enlarged or diminished by screwing the sleeve 9 outward or inward on the rod 7. Complemental index marks on the rim of sleeve 9 and the adjacent surface of the rod 7 over which the sleeve passes serve the purpose of a micrometer to measure minutely and accurately the width of the gap 10.

The other terminal 2 is connected to a bent arm 11, preferably made as a tube for strength and lightness, which, for the purpose of rigid support, is secured to a sleeve or band 4 surrounding and supported by a tube or sleeve 15 of insulating material, the latter enveloping the tubular condenser plate 14 and being supported by the dielectric body 5. The width and depth of the space between the terminals and arm 11 are made of such values that the terminals may be passed on opposite sides of an insulating unit of a suspension string and be placed in contact with the hardware connections at opposite sides of such unit, as indicated in Figure 2.

The inner end of the dielectric member 5 is enlarged at 5ª, where it is recessed internally to form a chamber 12, and is screw-threaded externally to take into a socket member 13.

There is mounted in the chamber 12 a telephonic receiver 16 which is suitably held with its diaphragm extending over and next to an orifice 17 in the holder 13. The terminals of the magnet winding in the receiver are connected respectively by a conductor 18 with the supporting sleeve 4 (and so, through arm 11, with terminal 2), and by the conductor 19 with the sleeve or plate 14 of the condenser. The plates or sleeves 3 and 14, with the intermediate dielectric 5 constitute a condenser between the terminal 1 and the receiver 16, preventing short circuit between the terminals through the receiver.

The socket member 13 is provided with an extension sleeve 13ª which is mounted tightly upon a holder 20 formed of non-conducting material, preferably of wood, having such strength and length as will enable it to be grasped in the hands of an operator and to be so held that the terminals may be brought into contact with a live electrical transmission line, or with insulators in such a line, while the operator is at a safe distance therefrom. The holder 20 is formed, or associated, with a sound conducting channel, and preferably such channel is provided by making the holder as a tube with continuous longitudinal bore 21 which opens to the orifice 17, so that sounds emitted by the diaphragm of the telephonic receiver are conducted through said channel. From the further end of the holder, the channel is extended through a flexible tube 22 of insulating material to ear pieces 23 connected by a head band 24 and adapted to be placed and held over the ears of an operator.

The condenser and the joints between its parts and the socket member 13, and also the arm 11, are completely enveloped in insulating material 25 which provides sufficient insulation so that the voltage required to break down this insulation is greater than that to which it can be subjected by the voltage of any high tension line in proximity to which the apparatus is used, no matter how the apparatus is handled in proximity to the line or insulator under test. Moreover the parts 5, 7, 9, 13 and 15, are of insulating material and the joints between them are of sufficiently great length so that, considering these joints as air gaps between the enclosed conducting members and the outside of the instrument, the insulating value of such air gaps is likewise great enough to prevent short circuiting through the apparatus. The characteristics of this insulation will be further described and explained in connection with the description of operation which follows.

In using the instrument, the operator holds the insulating rod or handle 20 in his hands, and the ear pieces 23 are placed over his ears. He tests the individual insulators a, b, c, etc. of a string suspending a high tension line conductor, by placing the terminals 1 and 2 in contact with the metallic members on opposite sides of the insulator under test, by which the insulators are connected together in a string. In doing this, the operator takes any convenient position where he can place the instrument in such proximity to the insulator and at the same time keep all parts of his own person at a safe distance away from the line conductor or other region of high voltage stress. When the electrical line is carried on towers the operator has to climb the tower in order to reach the insulators. He is himself in electrical contact with the earth and must remain at a safe distance from the line and from the insulators. The long insulating holder rod or handle 20 enables him to do this.

If the difference of potential at opposite sides of the insulator unit being tested is great enough to overcome the resistance interposed by the gap 10 to flow of electricity from the terminal 1 into the conductor 6, the condenser is alternately charged and discharged with each cycle of the current, but there is no direct flow of current through the circuit between the points at different potential. This circuit, in terms of current flow, is therefore an open circuit. At the same time the telephonic receiver, connected with the terminal 2 and with the condenser plate 14, is caused to emit a sound, which is conducted by the channel in the holder 20 and in the flexible extension tube 22 to the operator's ears. By adjusting the micrometer sleeve 9, the gap 10 may be made longer or shorter, and adjusted to a value at which a sound will be produced when the voltage stress is equal to or greater than a certain value, but will not be produced if the stress is below this value. The length of the gap is measured by the micrometer scales or indices on the contiguous visible parts of the members 7 and 9. Such scales or indices may be designated in terms of the voltage stress which will cause sound to be given off by the telephonic receiver with the different gap settings. Thereby the operator, by adjusting the micrometer device, may determine with substantial accuracy just what the voltage stress between any two points is, and consequently what the insulating value of the unit under test is. If the gap is set in advance for a stress which is required that a given insulating unit shall withstand, then the presence or absence of an audible indication determines whether the insulator being tested is up to standard or is defective. Owing to the audible signal thus produced, the operator need not look for a visible signal, or attempt to estimate by reference to the character of any visible signal whether the insulator is good or bad. He can, by a qualitative audible signal alone make the required determination.

In enabling the instrument to be used as above described, with safety to the operator and to the line, the protection given to the insulating holder 20, by the flexible extension tube of insulating material, and by the insulation 25, are all important. I realize the danger involved in using around or near live transmission lines, any piece of apparatus having a sufficient length of good conducting material exposed which might short circuit or ground the transmission line or an insulator supporting such line, or any considerable part of such an insulator. When any such short circuit or ground takes place there may be a resulting power arc or discharge which is very dangerous to the life of an operator or any other person near by, as has been abundantly proved by fatal and other serious accidents. Such short circuits or grounds may also produce enormous electrical strains in certain parts of the whole electrical system attached to the line; and very serious accidents, causing destruction of apparatus may result therefrom. Moreover such electrical strain may start short circuits or arcs in other parts of the system which may do an equal amount of damage, or even more damage than the original short circuit or ground.

The holder or handle 20, which may have a length of 10 feet more or less, and at any event is long enough to enable the operator to hold the terminals up to the insulator, while he himself is safely removed from the line, safeguards the operator so far as the manipulation of the instrument is concerned. Furthermore the insulating nature of the flexible tube 22, which is long enough to permit free manipulation of the handle without breaking the sound conducting connection between the operator's ears and the telephonic receiver, protects the operator from harm if the slack of the tube should happen to come into contact with some part of a line where the voltage is high. Finally the protecting insulation in and around the head of the instrument (and by head in this connection I mean the parts shown in Figure 1 which include the terminals, electrical conductors and telephonic receiver), prevents any short circuiting between parts of the line or points in the vicinity of the line, between which there is a substantial difference of potential.

The nature and quality of the last mentioned insulation is a feature which, prior to my invention, has not been used or understood. It is of the highest importance however, since it makes the apparatus safe to use under all conditions. The insulation 25 surrounds all the conducting parts of the testing device head, except the smallest parts which will suffice as conducting terminals, namely the terminals 1 and 2, and the dielectric strength of such insulation increases in proportion to the distance away from these terminals, or either of them. Such dielectric strength at any point must be great enough to insulate effectively the enclosed conducting part against any voltage stress to which it can be subjected by the voltage of the high tension line, no matter how the testing device is handled, either purposely or accidentally, around the line under test. Thus, to take a specific instance for illustration, if any of the conducting parts of the apparatus extends over a lineal distance of, say, twelve inches from the terminal, the insulation must have a dielectric strength equivalent to the maximum voltage which can be impressed across that distance by the structural and electrical characteristics of the transmission line, plus a factor of safety. This condition is fulfilled by the external insulation 25 and by the length of the joints between the several members of the device, which have an equivalent air distance dielectric effect. It is to be remembered of course that no danger of short circuiting between the terminals 1 and 2 exists, because the condenser dielectric maintains an open circuit between these terminals. The insulation which I have more particularly referred to in the last part of the description prevents short circuiting between either terminal and any other conducting part of the apparatus.

It will be seen therefore, that by my invention I have produced an apparatus which is safe to use, both from the point of view of the operator's safety and the point of view of the safety of the line and associated equipment and is definite and certain in its capability of indicating both qualitatively and quantitively the condition of an insulating unit, as to its insulating value, and the intensity of voltage stress between the two points.

What I claim and desire to secure by Letters Patent is:

1. An apparatus for testing the insulating qualities of insulating units for electrical power lines under voltage stress, comprising an insulating holder, a condenser mounted thereon, and conducting elements electrically connected to opposite sides of the condenser and extending outwardly therefrom into position to engage with the conducting material at opposite sides of such unit, one of such conducting elements being divided and the parts thereof separated by an adjustable gap; combined with a micrometer adjusting member for regulating and measuring the length of said gap; all the electrically conductive parts of said apparatus, except the terminals of said conducting elements, being enclosed in external insulation, the insulating value of which at any point is sufficient to withstand the maximum voltage of the high tension electrical transmission line in proximity to which the apparatus is used.

2. An apparatus for testing the insulating qualities of insulating units for electrical power lines under voltage stress, comprising an insulating holder, a condenser mounted thereon, and conducting elements electrically connected to opposite sides of the condenser and extending thence with a separation between them sufficient to permit contact of their terminals with the conducting material at opposite sides of such a unit, said conducting elements having exposed terminals and being otherwise externally insulated, and one of the conducting elements being divided to provide an adjustable gap between its parts; the insulation for said divided element comprising a rod of insulating material enveloping one of said parts and a sleeve enveloping the other of said parts except the terminal thereof, said sleeve being screw threaded on the rod and adjustable to produce a gap of variable width between said parts.

3. An apparatus for testing the insulating qualities of insulating units of electrical power lines under voltage stress, comprising an insulating holder, a condenser mounted thereon, conducting elements electrically connected to opposite sides of the condenser and arranged to permit their terminals being brought into contact with the conducting material at opposite sides of such a unit, one of said elements being divided between its terminal and the condenser, and insulation enclosing said conducting elements except the terminals thereof, the insulation for the said divided conducting element comprising a rod embedding one part of the element and a sleeve telescopically mounted on the rod carrying the terminal part of the element and adjustable to produce a variable gap between said parts, the length of the joint between said sleeve and rod being such as to provide air gap insulation sufficient to withstand the maximum normal voltage stress of the line in proximity to which the apparatus is used.

4. An apparatus for testing the insulating qualities of insulating units for electric power lines under voltage stress, comprising a nonconducting support, a condenser, a conducting element in electrical connection with one side of said condenser having an exposed terminal, a second conducting element also having an exposed terminal separated from the first named terminal, a telephonic receiver in series electrical connection with the last named conducting element and with the other side of said condenser, one of said conducting elements being divided and the terminal part thereof being adjustable toward and away from the other part to provide a variable gap, the length of which is a measure of the electrical potential between the two terminals sufficient to charge the circuit of said receiver, and means for conducting sound from said receiver to the ear of an operator at a safe distance from the power line in connection with which the apparatus is used, said sound conducting means being nonconductive of electricity.

5. An apparatus for testing the insulating qualities of insulating units for electrical power lines under voltage stress, comprising an insulating support, a testing head mounted on said support having conducting elements with separated exposed terminals, a condenser mounted in said head, to the opposite sides of which said elements are respectively connected, an electrical sound producing device in said head connected in series with one of the conducting elements and with one side of the condenser, the other element being connected with the other side of the condenser and insulated by the dielectric of the condenser from the sound producing device, one of said conducting elements being divided and the terminal part thereof being adjustable toward and away from the other part to make a gap of variable length, and an insulating sound conducting channel extending from the sound producing device and adapted to be brought to the ear of an operator at a safe distance from the region of voltage stress in which said terminals are placed.

6. An apparatus for testing the insulating qualities of insulating units for electrical power lines, comprising a condenser, conducting elements in electrical connection with the opposite sides of the condenser and having separated exposed terminals, one of said conducting elements being divided and its terminal section being adjustable with respect to its other section to make a variable air gap, a telephonic receiver interposed in series in the connection between the condenser and one of said conducting elements, insulating material surrounding said condenser and receiver and all the conducting elements except the exposed terminals, said insulating material having insulating value at all points sufficient to withstand the greatest voltage stress to which it can be subjected by the voltage of any high tension line in proximity to which the apparatus is used, and an insulating sound conductor leading from the receiver and having an ear terminal at a safe distance therefrom.

7. An apparatus for testing the insulating qualities of insulating units under voltage stress comprising an insulating holder including a sound conducting channel, a socket member secured to said holder, a condenser mounted in said socket member and including a dielectric structure cooperating with said socket member to form an enclosed chamber, terminals extending from the conducting material forming the opposite sides of said condenser, and an electrical sound producing device located in said chamber and having one of its terminals connected with one of the aforesaid condenser terminals, the other terminal of said sound producing device being insulated by the dielectric of the condenser from the other condenser terminal.

8. An apparatus for testing the insulating qualities of insulating units under voltage stress comprising an insulating holder including a sound conducting channel, a socket member secured to said holder, a condenser mounted in said socket member and including a dielectric structure cooperating with said socket member to form an enclosed chamber, terminals extending from the conducting material of the opposite sides of said condenser, and an electrical sound producing device located in said chamber and having one of its terminals connected with one of the aforesaid condenser terminals, the other terminal of said sound producing device being insulated by the dielectric of the condenser from the other condenser terminal, all the joints between said socket and the said cooperating dielectric structure of the condenser, and between the several parts of the condenser having a length corresponding to an air gap distance of which the insulating value is such that the voltage required to break down this insulation is greater than that to which the apparatus can be subjected by the voltage of any high tension line in proximity to which it is used.

9. An apparatus for testing the insulating qualities of insulating units under voltage stress comprising an insulating holder having a sound channel, a socket member of insulating material formed with a tubular shank receiving and fitting on said holder, a dielectric tubular body fitted into said socket member and cooperating therewith to form an enclosed chamber, a cylinder of conducting material surrounding said body, a conductive member within said dielectric body, forming in conjunction with the before named conductive cylinder a condenser, a dielectric rod fitted into said body, a conductor embedded in said rod and terminating at the outer end thereof, a sleeve of non-conductive material threaded upon said dielectric rod and surrounding the outer part of said conductor, a terminal conducting element mounted in said sleeve and projecting outwardly therefrom, its inner end being complemental to the outer end of the before named conductor to form an air gap of variable length determined by the adjustment of said sleeve, a second conductor supported by the foregoing structure and having an exposed terminal, insulating material enveloping the last named conductor except its terminal, and a telephonic receiver in the before named chamber having its terminals connected respectively with the first named conductive cylinder and with the last named conductor; the said conductive terminals being spaced apart from one another and adapted to be brought into contact with conducting material at either side of an insulating unit, and the dielectric material at any point having insulating value sufficient to withstand the maximum voltage stress to which the apparatus can be subjected by the voltage of any high tension electrical transmission line and the insulators of such line in proximity to which the apparatus is used, and the joints between the several bodies of dielectric material having a length sufficient to provide air gap insulation of equivalent value.

In testimony whereof I have affixed my signature.

FRANK C. DOBLE.